(12) United States Patent
Onomatsu

(10) Patent No.: US 7,600,247 B2
(45) Date of Patent: Oct. 6, 2009

(54) TELEVISION TUNER

(75) Inventor: Takehiro Onomatsu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 743 days.

(21) Appl. No.: 11/151,329

(22) Filed: Jun. 13, 2005

(65) Prior Publication Data
US 2006/0055831 A1 Mar. 16, 2006

(30) Foreign Application Priority Data
Jun. 15, 2004 (JP) .............................. 2004-176702

(51) Int. Cl.
- *H04N 7/20* (2006.01)
- *G06F 3/00* (2006.01)
- *H04B 1/00* (2006.01)
- *H04B 1/10* (2006.01)
- *H04B 7/00* (2006.01)
- *H04B 15/00* (2006.01)
- *H04B 17/02* (2006.01)

(52) U.S. Cl. ..................... 725/72; 715/716; 455/63.4; 455/139; 455/276.1; 455/303; 455/304

(58) Field of Classification Search ............... 725/72; 455/63.4, 139, 276.1, 303, 304
See application file for complete search history.

(56) References Cited

U.S. PATENT DOCUMENTS

| | | | | |
|---|---|---|---|---|
| 4,605,968 A | * | 8/1986 | Hayashi ..................... | 725/72 |
| 6,009,124 A | * | 12/1999 | Smith et al. ................ | 375/267 |
| 6,313,886 B1 | * | 11/2001 | Sugiyama .................. | 348/731 |
| 6,941,522 B2 | * | 9/2005 | Brown ....................... | 715/772 |
| 2002/0051085 A1 | * | 5/2002 | Lee ............................ | 348/570 |
| 2003/0228857 A1 | * | 12/2003 | Maeki ..................... | 455/278.1 |

FOREIGN PATENT DOCUMENTS

| | | |
|---|---|---|
| JP | H04-060478 A | 2/1992 |
| JP | H05-048315 A | 2/1993 |
| JP | 11-298226 | 10/1999 |

(Continued)

OTHER PUBLICATIONS

Japanese Notice of the reason for refusal, dated Jan. 23, 2008.

(Continued)

*Primary Examiner*—Dominic D Saltarelli
(74) *Attorney, Agent, or Firm*—Yokoi & Co., U.S.A., Inc.; Peter Ganjian

(57) ABSTRACT

A television tuner that receives a television signal using a smart antenna includes a rescan unit that executes rescan; that is: that when an instruction that instructs direct selection of a reception channel on which a television signal is currently received is issued during reception of a television broadcast service, causes an antenna control section to vary or control the receiving direction of the smart antenna and causes a signal state detector section to detect the states of signals sampled in all receiving directions; and that if the state of a signal detected by the signal state detector section agrees with a predetermined signal state, preserves the receiving direction of the smart antenna in which the signal is sampled. Consequently, rescan can be executed for all the receiving directions of the smart antenna by performing a simple manipulation.

4 Claims, 11 Drawing Sheets

FOREIGN PATENT DOCUMENTS

| | | |
|---|---|---|
| JP | H11-298226 A | 10/1999 |
| JP | 2000-299655 A | 10/2000 |
| JP | 2001-094899 A | 4/2001 |
| JP | 3090315 U | 9/2002 |
| JP | 3090315 U | 9/2002 |
| JP | 2002-344838 A | 11/2002 |
| JP | 2002-369087 A | 12/2002 |

OTHER PUBLICATIONS

Japanese Notice of the reason for refusal, dated Apr. 11, 2008.

* cited by examiner

FIG. 5

FIRST TABLE

| Physical channel number | Frequency band (MHz) |
|---|---|
| 2 | 90~96 |
| 5 | 108~114 |
| 7 | 126~132 |
| 9 | 168~174 |
| ⋮ | ⋮ |
| 64 | 278~284 |
| 67 | 290~296 |
| 69 | 312~318 |

FIG. 6

SECOND TABLE

| Virtual channel number | Physical channel number |
|---|---|
| — | 2 |
| — | 5 |
| — | 7 |
| — | 9 |
| ⋮ | ⋮ |
| 70 | 64 |
| 71 | 67 |
| 80 | 69 |
| 81 | |
| 82 | |

FIG. 7

SECOND TABLE

| Virtual channel number | Physical channel number |
|---|---|
| — | 2 |
| — | 5 |
| — | 7 |
| — | 9 |
| ⋮ | ⋮ |
| 74 | 64 |
| 75 | 67 |
| 80 | 69 |
| 81 | |
| 82 | |

TELEVISION TUNER

BACKGROUND OF THE INVENTION

1. Field of the Invention

The present invention relates to a television tuner that receives a television signal using a smart antenna.

2. Description of the Related Art

In television broadcast, transmitting points of broadcast stations may be different from one another. In this case, if television broadcast services provided by the broadcast stations are received at a certain receiving point, a television receiver must be brought to a state in which the receiver can receive a television signal on a desired reception channel. Moreover, the directivity of an antenna must be adjusted so that the antenna will be directional to the transmitting point at which a television signal is transmitted on the reception channel.

In the past, a television receiver including a smart antenna whose directivity can be statically varied with an electric signal has been known (refer to, for example, Japanese Unexamined Patent Publication No. 22-298226). In the television receiver, when change of reception channels is instructed by manipulating a remote control or the like, the receiving direction of the smart antenna or a direction in which the smart antenna receives a television signal is automatically varied in order to scan television radio waves sampled in all directions so as to thus detect a direction in which television radio waves are received under satisfactory conditions.

However, when the television receiver described in Patent Document 1 is instructed to change reception channels by manipulating a remote control or the like, television signals sampled in all the directions of the smart antenna are scanned in order to detect a direction in which a satisfactory television signal is received. When image quality is degraded during reception of a television broadcast service on the same channel, if television signals sampled in all the directions are rescanned to detect a receiving direction in which a satisfactory television signal is received, the reception channel must be temporarily switched to any other channel. Thereafter, the channel must be returned to the original reception channel. This is time-consuming.

SUMMARY OF THE INVENTION

Accordingly, an object of the present invention is to provide a television tuner capable of rescanning television signals sampled in all receiving directions of a smart antenna by performing a simple manipulation.

In efforts to accomplish the above object, according to the present invention, there is provided a television tuner that receives a television signal using a smart antenna that can be statically adjusted with an electric signal to exhibit directivity in a selected direction. The television tuner comprises:

a directivity control section that transmits an electric signal with which the directivity of the smart antenna is adjusted so that the smart antenna will be directional to a selected direction;

a tuner section that receives a television signal, which falls within a frequency band corresponding to a predetermined reception channel, via the smart antenna; and a signal state detector section that detects the state of a signal sent from the tuner section by detecting an automatic gain control (AGC) voltage with which the amplification factor of a signal sent from the tuner is defined and/or detecting the bit error rate of a digital signal sent from the tuner section.

The reception channel refers to a physical channel assigned to a frequency band on a one-to-one correspondence or one or two or more virtual channels associated with each physical channel.

The television tuner further comprises:

a memory unit in which a first table indicating the relationship of correspondence between the physical channels and the frequency bands, a second table indicating the relationship of correspondence between the virtual channels and the physical channels, and a reception channel on which a television broadcast service is currently received are stored;

a verification unit that when an instruction is issued to instruct direct selection of a reception channel, verifies whether the reception channel specified in the instruction agrees with the reception channel stored in the memory unit;

a rescan unit that executes rescan; that is: that when the verification unit verifies that the reception channel specified in the issued instruction of direct channel selection agrees with the reception channel stored in the memory unit, if the reception channel is a physical channel, references the first table stored in the memory unit so as to determine a frequency band within which the tuner section receives a television signal; that if the reception channel is a virtual channel, references the first table and the second table, which are stored in the memory unit, so as to determine a frequency band within which the tuner section receives a television signal; that then causes the antenna control section to vary or control the receiving direction of the smart antenna, and causes the signal state detector section to detect the states of signals sampled in all receiving directions; that if the state of a signal detected by the signal state detector section is a predetermined signal state, preserves the receiving direction of the smart antenna in which the signal is sampled; and a display control unit that displays a representation signifying that rescan executed by the rescan unit is under way.

In the present invention having the foregoing components, the tuner section receives a television signal, which falls within a frequency band corresponding to a predetermined reception channel, via the smart antenna. Moreover, the signal state detector section detects the state of a signal sampled by the tuner section. The reception channel refers to a physical channel assigned to a frequency band on a one-to-one correspondence or one or two or more virtual channels associated to each physical channel. Moreover, a first table indicating the relationship of correspondence between the physical channels and the frequency bands, a second table indicating the relationship of correspondence between the virtual channels and the physical channels, and the reception channel on which a television broadcast service is currently received are stored in the memory unit.

Moreover, when an instruction is issued to instruct direct section of the reception channel, the verification unit verifies whether the reception channel specified in the instruction agrees with the reception channel stored in the memory unit.

Furthermore, the rescan unit performs rescan. Namely, when the verification unit verifies that the reception channel specified in the instruction of direct channel selection agrees with the reception channel stored in the memory unit, if the reception channel is a physical channel, the rescan unit references the first table stored in the memory unit so as to determine a frequency band within which the tuner section receives a television signal. If the reception channel is a virtual channel, the rescan unit references the first and second tables stored in the memory unit so as to determine a frequency band within which the tuner section receives a television signal. Thereafter, the rescan unit causes the antenna control section to vary or control the receiving direction of the smart antenna, and causes the signal state detector section to detect the states of signals sampled in all receiving directions. When the state of a signal detected by the signal state detector section is a predetermined signal state, the receiving direction of the smart antenna in which the signal is sampled is preserved. Owing to the foregoing components, rescan can be initiated by reselecting a reception channel, on which a television picture is currently received, using a remote control or the like, that is, by performing a simple manipulation which a user can intuitively grasp.

Furthermore, the display control unit displays a representation signifying that rescan executed by the rescan unit is under way. This permits a user to recognize that the rescan is under way.

Moreover, according to another aspect of the present invention, there is provided a television tuner that receives a television signal via a smart antenna that whose can be statically adjusted with an electric signal to exhibit directivity in a selected direction. The television tuner comprises:

a directivity control section that transmits an electric signal with which the directivity of the smart antenna is adjusted so that the smart antenna will be directional to a selected direction;

a tuner section that receives a television signal, which falls within a frequency band corresponding to a predetermined reception channel, via the smart antenna; and a signal state detector section that detects the state of a signal sent from the tuner section.

The television tuner further comprises a rescan unit that executes rescan; that is: that when an instruction is issued to instruct direction selection of a reception channel on which a television picture is currently received during reception of a television broadcast service, causes the antenna control section to vary or control the receiving direction of the smart antenna, and causes the signal state detector section to detect the states of signals sampled in all receiving directions; and that when the state of a signal detected by the signal state detector section is a predetermined signal state, preserves the receiving direction of the smart antenna in which the signal is sampled.

In the present invention having the foregoing components, the tuner section receives a television signal, which falls within a predetermined frequency band, via the smart antenna. The signal state detector section detects the state of a signal sampled by the tuner section.

Moreover, the rescan unit executes rescan. Namely, when an instruction is issued to instruct direction selection of a reception channel on which a television picture is currently received, the rescan unit causes the antenna control section to vary or control the receiving direction of the smart antenna, and causes the signal state detector section to detect the states of signals sampled in all receiving directions. When the state of a signal detected by the signal state detector section is a predetermined signal state, the receiving direction of the smart antenna in which the signal is sampled is preserved. Owing to these components, rescan can be initiated by reselecting a reception channel, on which a television picture is currently received, using a remote control or the like, that is, by performing a simple manipulation which a user can intuitively grasp.

Furthermore, according to another aspect of the present invention, a display control unit for displaying a representation signifying that rescan executed by the rescan unit is under way is included. Owing to the component, the representation signifying that rescan is under way is displayed. This permits a user to recognize that the rescan is under way.

Furthermore, according to another aspect of the present invention, the reception channel refers to a physical channel assigned to a frequency band on one-to-one correspondence or one or two or more virtual channels associated with each physical channel.

The television tuner further comprises:

a memory unit in which a first table indicating the relationship of correspondence between the physical channels and the frequency bands, a second table indicating the relationship of correspondence between the virtual channels and the physical channels, and a reception channel on which a television picture is currently received are stored; and a verification unit that when an instruction is issued to instruct direction selection of a reception channel, verifies whether the reception channel specified in the instruction agrees with the reception channel stored in the memory unit.

When the verification unit verifies that the reception channel specified in the instruction of direction channel selection agrees with the reception channel stored in the memory unit, if the reception channel is a physical channel, the rescan unit references the first table stored in the memory unit so as to determine a frequency band within which the tuner section receives a television signal. If the reception channel is a virtual channel, the rescan unit references the first and second tables stored in the memory unit so as to determine a frequency band within which the tuner section receives a television signal. Thereafter, the rescan unit causes the antenna control section to vary or control the receiving direction of the smart antenna, and causes the signal state detector section to detect the states of signals sampled in all receiving directions. When the state of a signal detected by the signal state detector section is a predetermined signal state, the receiving direction of the smart antenna in which the signal is sampled is preserved.

In the present invention having the foregoing components, the reception channel refers to a physical channel assigned to a frequency band on one-to-one correspondence or one or two or more virtual channels associated with each physical channel. A first table indicating the relationship of correspondence between the physical channels and the frequency bands, a second table indicating the relationship of correspondence between the virtual channels and the physical channels, and a reception channel on which a television picture is currently received are stored.

Furthermore, when an instruction is issued to instruct direct selection of a reception channel, the verification unit verifies whether the reception channel specified in the instruction agrees with the reception channel stored in the memory unit. When the verification unit verifies that the reception channel specified in the instruction of direct channel selection agrees with the reception channel stored in the memory unit, if the reception channel is a physical channel, the rescan unit references the first table stored in the memory unit so as to determine a frequency band within which the tuner section receives a television signal. If the reception channel is a virtual channel, the rescan unit references the first and second tables stored in the memory unit so as to determine a frequency band within which the tuner section receives a television signal. Thereafter, the rescan unit causes the antenna control section to vary or control the receiving direction of the smart antenna, and causes the signal state detector section to detect the states of signals sampled in all receiving directions. When the state of a signal detected by the signal state detector section is a predetermined signal state, the receiving direction of the smart antenna in which the signal is sampled is preserved. Consequently, when an instruction is issued to instruct direct selection of a physical channel or a virtual channel on which a television picture is currently received during reception of a television broadcast service, rescan can be performed.

Furthermore, according to another aspect of the present invention, the signal state detector section is realized with an AGC circuit that detects an automatic gain control (AGC) voltage with which the amplification factor of a signal sent from the tuner section is determined.

In the present invention having the foregoing component, a receiving direction in which an intermediate-frequency signal sent from the tuner section has been sampled in a good state can be stored.

Furthermore, according to another aspect of the present invention, the signal state detector section is realized with a demodulator circuit that detects a bit error rate of a digital signal sent from the tuner section.

In the present invention having the foregoing component, a receiving direction in which a signal having few erroneous bits and being sent from the tuner section has been sampled can be stored.

Incidentally, the sections and units included in a television tuner in accordance with the present invention may be included in a television. Namely, the present invention can be adapted to a television having the capability of a tuner.

BRIEF DESCRIPTION OF THE DRAWINGS

FIG. 5 shows an example of a first table;

FIG. 6 shows an example of a second table;

FIG. 7 shows an example of the second table modified because virtual channels associated with physical channels are changed from ones to the others;

DESCRIPTION OF THE PREFERRED EMBODIMENTS

Figure 1:
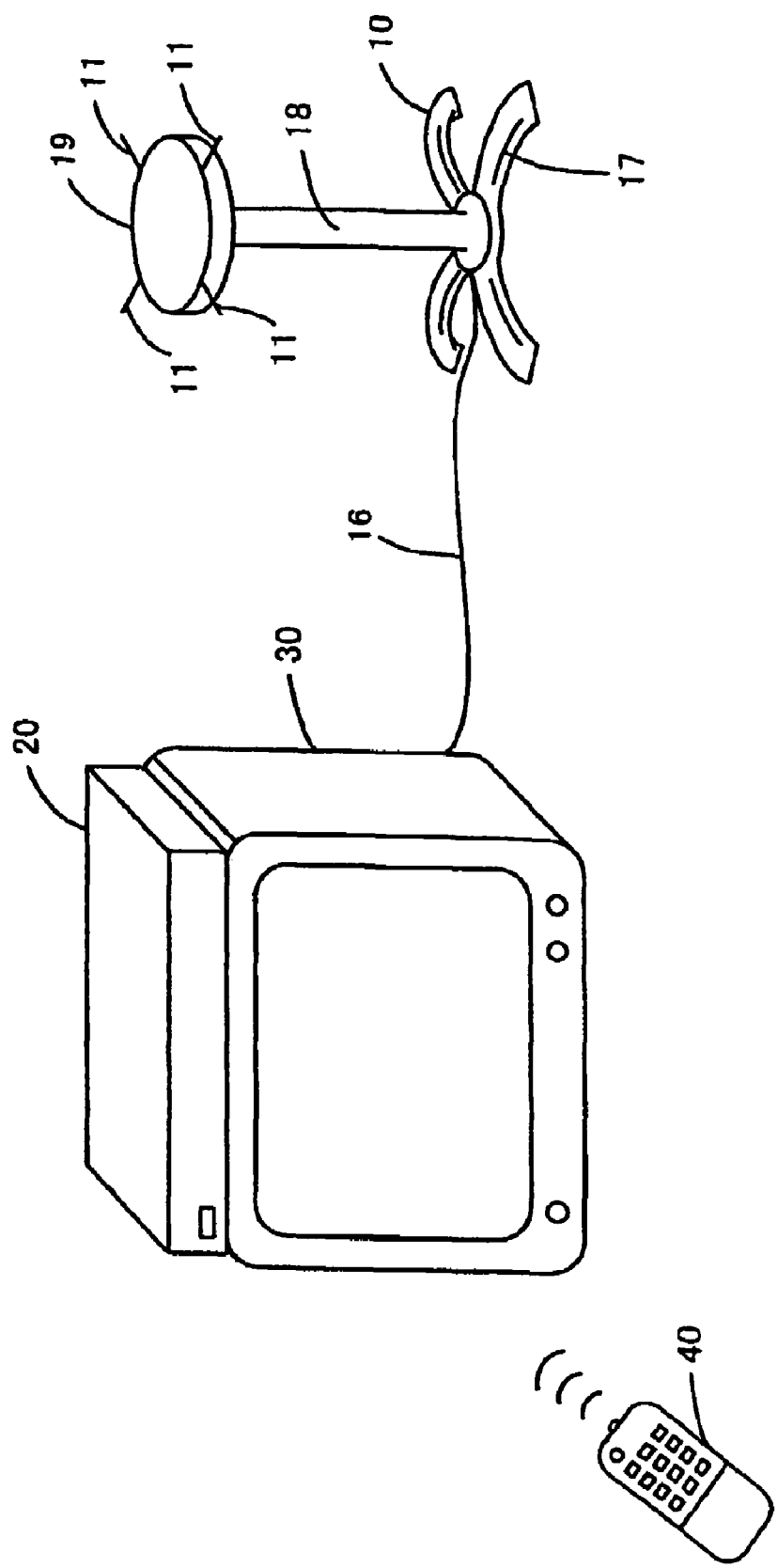
FIG. 1 is a block diagram showing the configuration of a television system.

FIG. 1 schematically shows the configuration of a television system including a television tuner in accordance with the present invention. In the drawing, the television system comprises a television 30 and a television tuner 20 shaped substantially like a rectangular box and connected to the television 30 over a cable that is not shown. The television tuner 20 is a so-called set-top box and can be placed at any position as long as it can be connected to the television 30. An antenna cable 16 is coupled to the television tuner 20. The television tuner 20 and a smart antenna unit 10 are connected to each other over the antenna cable 16.

The smart antenna unit 10 has support legs 17 that help dispose the smart antenna unit stably on a floor. A substantially cylindrical column 18 stands on the support legs 17 substantially vertically. An antenna holder 19 that is shaped like a plate which looks substantially like a square in a plan view is held at the upper end of the column 18. The antenna holder 19 is placed substantially horizontally and has four rod-like directional antennas 11 radially jutted out of the flank thereof. An angle between adjoining ones of the directional antennas 11 is 90°. This signifies that the directional antennas 11 are disposed on the flank of the antenna holder 19 in an equiangular manner in the circumferential direction thereof. Moreover, the directional antennas 11 are stretchable so that a user can appropriately stretch the directional antennas 11 for use. The phase of a predetermined one of radio waves received by the directional antennas 11 is shifted, whereby the directivity of the smart antenna unit 10 can be controlled relative to all directions. Owing to the foregoing construction, from whatever direction a television ground wave is originated with respect to the smart antenna unit 10, the directivity of the antenna unit can be adjusted so that the antenna unit will be directional to that direction. Consequently, television radio waves originated from a larger number of broadcast stations can be received. In other words, a user can enjoy more television broadcast services provided on a larger number of channels.

Figure 2:
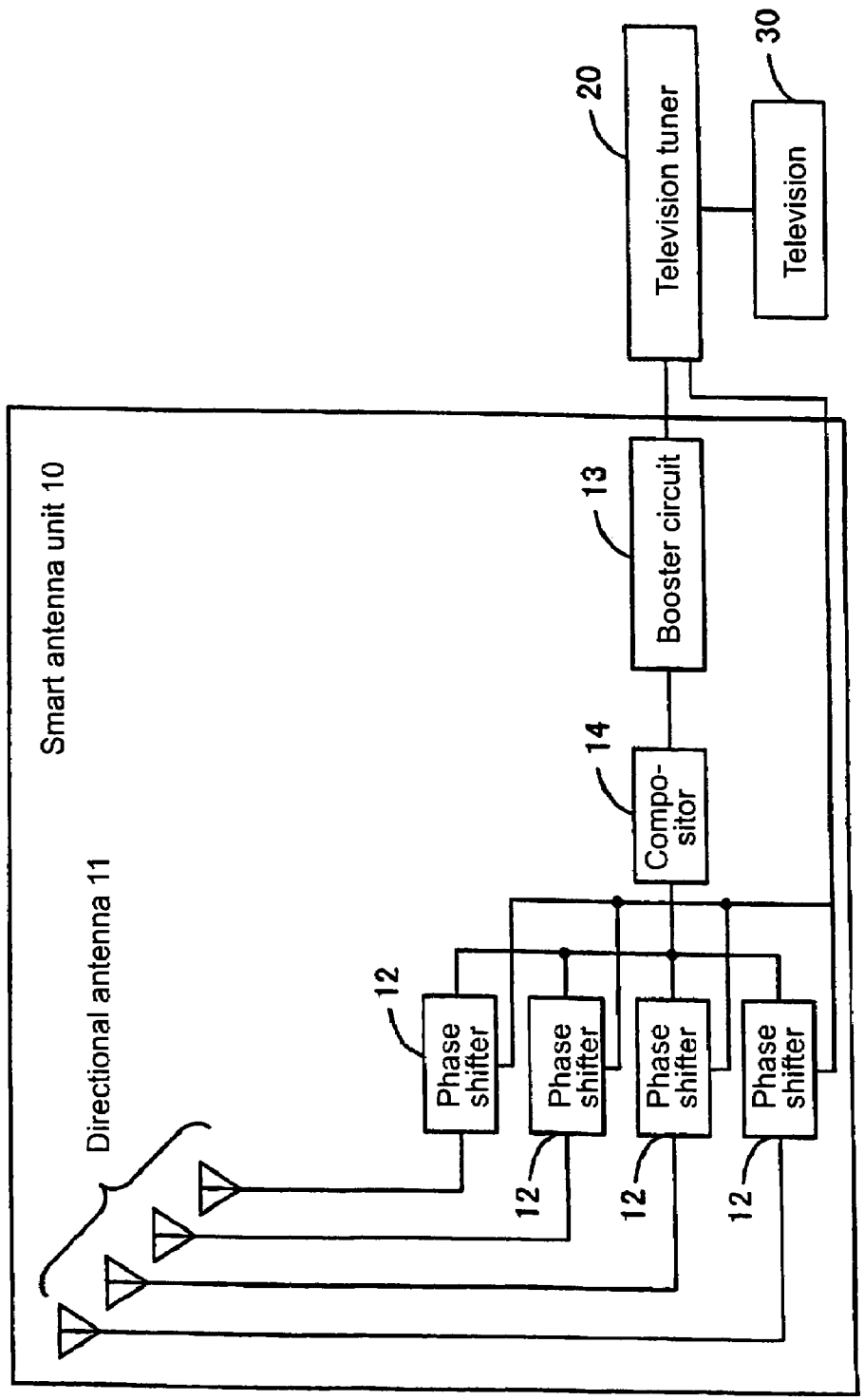
FIG. 2 is a block diagram showing the internal configuration of a smart antenna unit.

FIG. 2 conceptually shows the internal configuration of the smart antenna unit 10. In the drawing, the four directional antennas 11 are connected to four phase shifters 12 over independent wirings. The phase shifters 12 are circuits each capable of controlling the phase of a signal received via an associated directional antenna 11. The phase shifters 12 can delay the phases of signals according to a bias voltage applied by the television tuner 20. Signals having the phases thereof controlled by the phase shifters 12 are transferred to a compositor 14 and synthesized in the compositor 14. A signal produced by the compositor 14 is transferred to a booster circuit 13 and amplified therein.

As mentioned above, signals sent from the four directional antennas 11 are synthesized while the phases thereof are shifted. Consequently, the four directional antennas 11 exhibit directivity in any directions including their axial directions. Namely, when phases by which the phase shifters 12 shift the phases of respective signals are set to appropriate values, the direction of a main beam formed by the smart antenna unit 10 can be set to any direction.

Figure 3:
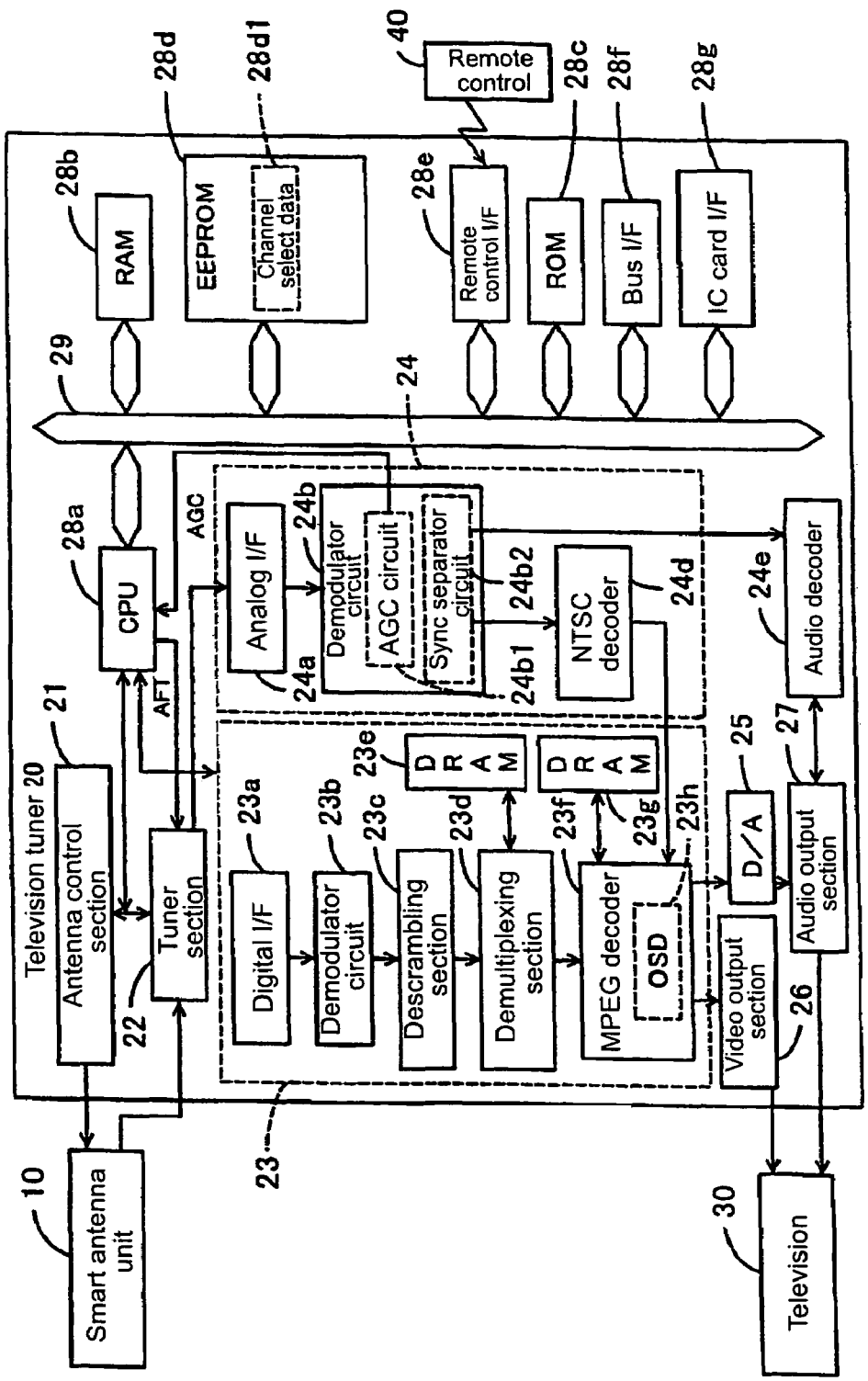
FIG. 3 is a block diagram showing the internal configuration of a television tuner.

FIG. 3 conceptually shows the internal configuration of the television tuner 20. In the drawing, the television tuner 20 comprises an antenna control section 21 that controls phases by which the phase shifters 12 shift the phases of respective signals, and a tuner section 22 that receives an alternating signal from the smart antenna unit 10. The television tuner 20 produces a signal, with which the directivities of the directional antennas included in the smart antenna unit 10 are controlled, in response to a command issued from a CPU 28a. Specifically, bias voltages to be applied to the phase shifters 12 are varied in order to vary the receiving direction of the smart antenna unit 10. The television tuner 20 includes a ROM that is not shown and in which sets of bias voltages to be applied to the phase shifters 12 are stored. Sixteen sets of bias voltages are stored. In response to a command issued from the CPU 28a, the television tuner 20 selects any of the sets of bias voltages and applies the selected bias voltages to the respective phase shifters 12.

Figure 4:
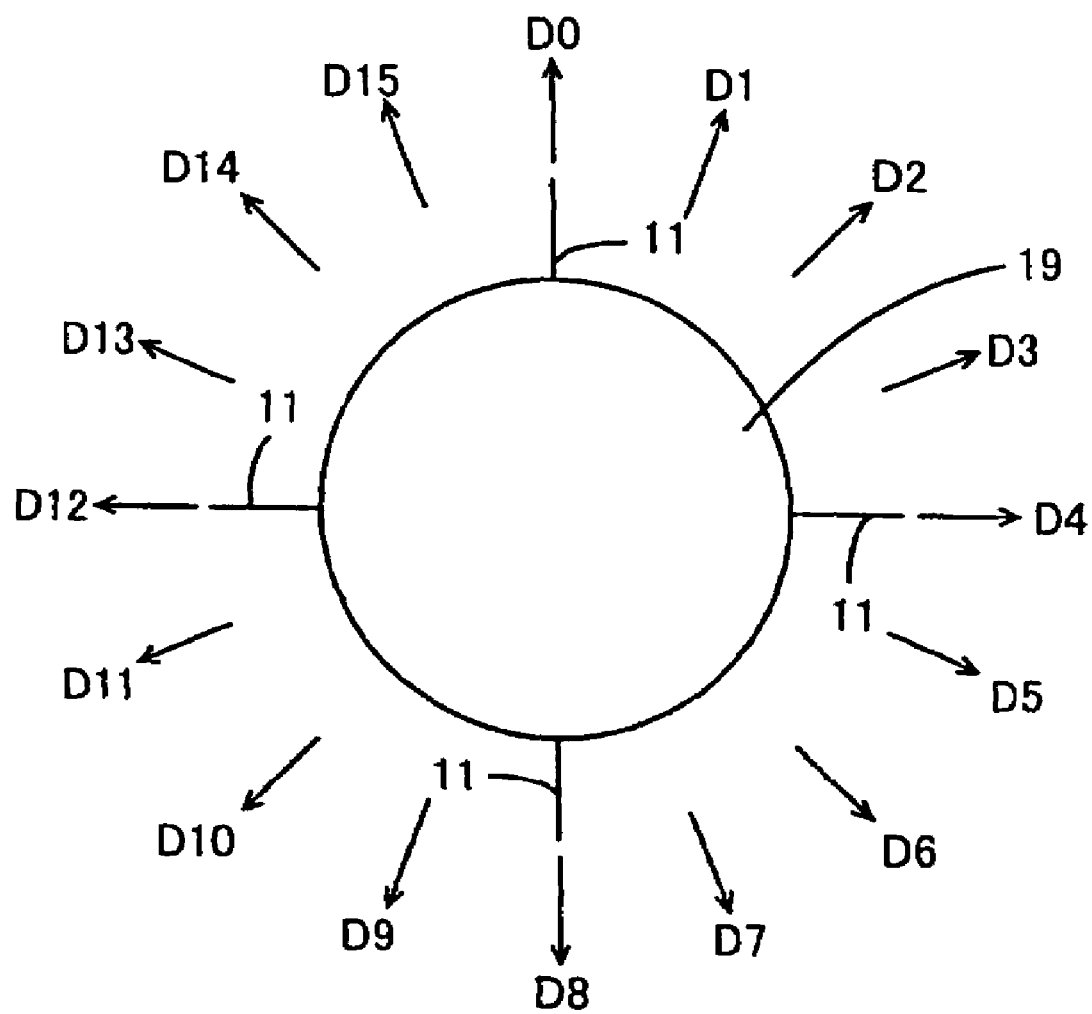
FIG. 4 is a conceptual diagram showing the directivity of the smart antenna unit.

In other words, the smart antenna unit 10 can receive radio waves in sixteen receiving directions. FIG. 4 shows the sixteen receiving directions. In the drawing, sixteen receiving directions are defined in a radially equiangular manner with the antenna holder 19 as a center. Namely, the difference between adjoining receiving directions is 22.5° that is a quotient of 360° by 16. Thus, since the receiving directions are defined in an equiangular manner with the antenna holder 19 as a center, the directivity of the smart antenna unit can be locked on broadcast radio waves coming in any direction. A receiving direction pattern D indicating a receiving direction and being drawn to point out the top of a sheet of paper shall be a receiving direction pattern D=0. The other receiving direction patterns shall be clockwise called receiving direction patterns D=1, D=2, D=3, etc., and D=15.

The tuner section 22 shown in FIG. 3 is of a so-called synthesizer type. PLL data, that is, data representing a frequency-division ratio defined in a variable frequency divider included in a phase-locked loop (PLL) is supplied as a channel selection control signal to the tuner section 22. Moreover, the tuner section 22 receives the PLL data as the channel section control signal from the CPU 28a, samples an alternating signal, which falls within a desired frequency band, from the received alternating signal, and thus selects one of a plurality of reception channels. The CPU 28a detects a frequency shift occurring in the tuner section 22, and applies an AFT voltage to the tuner section 22 according to the result of the detection. The tuner section 22 corrects a frequency band, within which a signal is sampled, according to the AFT voltage. Consequently, an optimal channel is selected.

An output of the tuner section 22 is supplied to either of a digital reproducer section 23 and an analog reproducer section 24. Namely, the television tuner 20 in accordance with the present invention can reproduce both digital and analog television signals. The digital reproducer section 23 comprises a digital interface (I/F) 23a, a demodulator circuit 23b, a descrambling section 23c, a demultiplexing section 23d, and an MPEG decoder 23g. An analog-to-digital (A/D) converter is included in the digital I/F 23a via which an alternating signal is received from the tuner section 22. A demodulator section to which the signal is supplied via the digital I/F 23a comprises a channel equalizer and an error correction decoder.

Namely, the digital I/F 23 and demodulator circuit 23b converts an alternating signal received from the tuner section 22 into a digital signal, and cancels a so-called ghost signal contained in the digitally demodulated signal according to control information sent from the CPU 28a. Furthermore, the digital I/F 23a and demodulator circuit 23b corrects erroneous bits occurring on a transmission line to produce a transport stream (TS). In the foregoing processing, the demodulator circuit 23b detects as an error rate the ratio of erroneous bits to the whole of data.

Moreover, the transport stream produced through demodulation and error correction performed by the demodulator circuit 23b is supplied to the descrambling section 23c. Since the transport stream is normally scrambled, a video signal and an audio signal cannot be properly reproduced from the transport stream. The descrambling section 23c descrambles the transport stream so as to restore a data stream from which the video and audio signals can be reproduced. The descrambled transport stream has the video and audio signals and character information multiplexed therein, and is then supplied to the demultiplexing section 23d. The demultiplexing section 23d demultiplexes the received data. Namely, the multiplexed state is canceled. The descrambling section 23c and demultiplexing section 23d can use a DRAM 23e as a work area to perform their pieces of processing.

When the multiplexed state is canceled through demultiplexing, the transport stream is separated into data that is conformable to the Moving Picture Experts Group (MPEG) standards and that has the video and audio signals compressed according to a predetermined method, and data containing character information on a program other than the video and audio signals. The latter data is supplied to the CPU 28a. On the other hand, the former MPEG data is supplied to the MPEG decoder 23g, and the MPEG decoder 23g decompresses, that is, decodes the MPEG data. The MPEG data is decoded, whereby a digital video signal and a digital audio signal are produced. The produced digital video signal is converted into an analog video signal.

The MPEG decoder 23g includes an on-screen display (OSD) block 23h and can therefore display a motion picture with a predetermined still image superimposed on the motion picture or display the predetermined still image in place of the motion picture. The OSD block 23h receives data representing received character information from the CPU 28a, and produces a still image or the like on the basis of the data representing character information.

Incidentally, the MPEG decoder 23g can use the DRAM 23f as a work area for MPEG decoding or OSD. The MPEG decoder 23g can therefore perform decompression and can perform graphic display using the OSD block 23g. A video signal having undergone decompression and digital-to-analog conversion is supplied to a video output section 26. The video output section 26 transmits the video signal to the television 30. Various signal forms including a composite signal and an S-Video signal may be adopted as the form of an analog video signal to be transmitted to the television 30.

On the other hand, an audio signal produced through MPEG decoding is transferred to a digital-to-analog (D/A) converter 25, and converted into an analog audio signal by the D/A converter 25. The analog audio signal is transferred to an audio output section 27, and the audio output section 27 transmits the analog audio signal to the television 30. However, if the television 30 has an optical input terminal or the like so as to receive a digital audio signal, the digital audio signal may be transmitted directly to the television 30 without passing through the D/A converter 23.

On the other hand, the analog reproducer section 24 comprises an analog interface (I/F) 24a, a demodulator circuit 24b, a National Television Standards Committee (NTSC) decoder 24d, and an audio decoder 24e. The analog I/F 24a and the demodulator circuit 24b include an AGC circuit 24b1 that amplifies an intermediate-frequency signal sent from the tuner section 22. The amplification factor at which the AGC circuit 24b1 amplifies the intermediate-frequency signal is defined with an AGC voltage. The AGC voltage varies depending on the amplitude of the intermediate-frequency signal amplified by the AGC circuit 24b1. Namely, the AGC circuit 24b1 amplifies the intermediate-frequency signal using the AGC voltage as a feedback signal.

To be more specific, if the amplified intermediate-frequency signal is too strong, the AGC voltage is lowered in order to decrease the amplification factor. If the amplified intermediate-frequency signal is too weak, the AGC voltage is raised in order to increase the amplification factor. Namely, in the present embodiment, the higher the AGC voltage is, the weaker the intermediate-frequency signal received from the tuner section 22 is. Consequently, the amplitude of the amplified intermediate-frequency signal can be held nearly constant. Eventually, reproduced colors are not different among channels. Moreover, since the AGC voltage is generated by comparing the amplified intermediate-frequency signal with a predetermined reference voltage, the amplitude of the amplified intermediate-frequency signal can be retained at an ideal value. The AGC voltage is transmitted to the CPU 28a, and the CPU 28a implements various controls according to the received AGC voltage.

The demodulator circuit 24b separates a demodulated intermediate-frequency signal so as to produce an analog video signal and an analog audio signal that are conformable to the NTSC standards. The produced analog video signal is transferred to the NTSC decoder 24d. The NTSC decoder 24d converts the analog video signal into a digital video signal conformable to the International Radio Consultative Committee (CCIR) 656 standard. The NTSC standards is the reference standards for analog television signals, and an NTSC signal includes a signal with which colors are reproduced, a horizontal synchronizing (sync) signal having a frequency of 15.75 kHz, and a vertical sync signal having a frequency of 60 Hz. The demodulator circuit 24b includes the sync separator circuit 24c that samples the horizontal sync signal and vertical sync signal. Based on the horizontal sync signal and vertical sync signal sampled by the sync separator circuit 24c, the NTSC decoder 24d produces a synchronized digital video signal. Incidentally, the CCIR 656 standard is the standard for digital video signals that digitally represent luminance (Y) information and chrominance (UV) information using a gray scale. On the other hand, an analog audio signal separated by the demodulator circuit 24b is supplied to the audio decoder 24e. The audio decoder 24e separates the analog audio signal into stereo signals on the right and left stereophonic channels.

A digital video signal produced by the NTSC decoder 24d is transferred to the MPEG decoder 23g, and then subjected to OSD and digital-to-analog conversion in the same manner as the aforesaid one. The video signal converted into an analog form is supplied to the video output section 26, and transmitted from the video output section 26 to the television 30. On the other hand, an audio signal is transferred to the audio output section 27, and transmitted from the audio output section 27 to the television 30.

The aforesaid CPU 28a is connected on a bus 29. The CPU 28a uses a RAM 28b connected on the bus 29 as a work area to execute control processing for realizing various abilities of the television tuner 20. A program that implements the control processing is stored in a ROM 28c in advance. The CPU 28a reads a predetermined program from the ROM 28c into the RAM 28b so as to execute control processing. Moreover, a rewritable EEPROM 28d is connected on the bus 29. The CPU 28a uses various data items stored in the EEPROM 28d to execute control processing.

Channel select data 28d1 is stored in the EEPROM 28d. The channel select data 28d1 is used to select a frequency band, within which the tuner section 22 receives a television signal, according to an instruction, which instructs direction selection of a reception channel, issued from a remote control 40. The channel select data 28d1 comprises a first table indicating the relationship of correspondence between physical channels, which are assigned to frequency bands on one-to-one correspondence, and the frequency bands, and a second table indicting the relationship of correspondence between virtual channels and the physical channels with each of which one or two or more virtual channels are associated. In the present embodiment, since the tuner section 22 adopts a synthesizer technique, the relationship of correspondence between the physical channels and data items representing division ratios is stored as the first table.

FIG. 5 shows an example of the first table. In the drawing, physical channel numbers 2, 5, 7, and 9 are channel numbers of channels assigned to analog television broadcast. The remote control 40 or the like is used to directly select any of the physical channel numbers, whereby a program associated with the physical channel number can be enjoyed. On the other hand, physical channel numbers 64, 67, and 69 are numbers of physical channels assigned to digital television broadcast. One or three virtual channels are, as described in conjunction with a drawing (FIG. 6) later, associated with each of the physical channel numbers.

FIG. 6 shows an example of the second table. In the drawing, one virtual channel is associated with each of physical channel numbers 64 and 67. The virtual channel numbers are numbers of channels assigned to digital television broadcast. The remote control 40 or the like is used to directly select any of the virtual channel numbers, whereby a program associated with the virtual channel number can be enjoyed. Moreover, three virtual channels 80 to 82 are associated with the physical channel number 69. Namely, a frequency band corresponding to one physical channel is trisected and associated with respective virtual channel numbers. Consequently, a large number of programs can be broadcast using a small number of frequency bands.

Moreover, a channel number (physical channel number or virtual channel number) of a channel on which a television picture is currently received is stored in the EEPROM 28d, through it is not shown in the drawing.

Furthermore, as shown in FIG. 7, each television broadcast station can modify physical channel numbers of physical channels that are assigned to digital television broadcast and that are associated with virtual channel numbers. In FIG. 7, virtual channels associated with the physical channel numbers 64 and 67 are changed from those shown in FIG. 6. Each television broadcast station transmits data, which represents the relationship of correspondence between physical channel numbers and virtual channel numbers, together with a television signal. The television tuner 20 receives the data together with the television signal, and updates the data recorded in the second table accordingly.

If the channel select data 28d1 is not stored in the EEPROM 28d, the remote control 40 or the like is used to enter an instruction of so-called auto-scan. Thus, the channel select data 28d1 must be stored in the EEPROM 28d. If the channel select data 28d1 is not stored, auto-scan may be automatically performed. Even if the channel select data 28d1 is stored, auto-scan may be performed in response to an instruction issued from the remote control 40 or the like. Thus, the channel select data 28d1 may be updated.

Moreover, OSD data 28d2 which the OSD block 23h uses to produce an on-screen display (OSD) image is stored in the EEPROM 28d. The CPU 28a reads the OSD data 28d2 according to a command issued from the remote control 40 or the operating condition of each circuit, and supplies the OSD data 28d2 to the OSD block 23h. For example, if the CPU 28a recognizes that a user must be warned, the CPU 28a reads the OSD data 28d2 required to produce a warning screen image and commands the OSD block 23h to insert the warning screen image to a television picture.

A remote interface (I/F) 28e is connected on the bus 29. An infrared flicker signal sent from the remote control 40 that is external equipment can be received via the remote I/F. The infrared flicker signal is transmitted to the CPU 28a over the bus 29. The CPU 28a executes associated control processing. Moreover, a bus I/F 28f via which the television tuner is connected to external equipment over a cable and an IC card I/F 28g via which data is transferred to or from an IC card are connected on the bus 29. Information read via the bus I/F 28f or the IC card I/F 28g is transmitted to the CPU 28a over the bus 29. The CPU 28a performs predetermined processing on the information.

The flow of main processing to be performed in the television tuner 20 shown in FIG. 1 and FIG. 3 will be described in conjunction with the flowchart of FIG. 8. First, at step S100, initialization is performed. During the processing, a register included in the CPU 28a is initialized, the RAM 28b is cleared, and setting data needed to perform white balance is read from the EEPROM 28d.

Thereafter, at step S110, video signal control processing is executed. During the processing, the CPU 28a controls the sections and circuits, which are included in the television tuner 20, according to a current channel number stored in the EEPROM 28a, and performs processing so that a television picture associated with the channel number will be displayed on the television 30.

Thereafter, at step S120, whether direct channel section is instructed is verified. Namely, whether the remote control 40 is used to issue an instruction that instructs direction selection of any channel number is verified.

Thereafter, at step Si 30, a channel number to be directly selected is checked to see if it agrees with the channel number of a channel on which a television signal is currently received. Namely, an instruction of direct selection is checked to see if it instructs direct selection of a channel number identical to the channel number of a channel on which a television picture is currently received. The processing is achieved by referencing the EEPROM 28d to retrieve a current channel number. If the channel number to be directly selected disagrees with the channel number of a channel on which a television picture is currently received, channel change is executed at step S140. The channel change will be described later in conjunction with the drawing (FIG. 9) later.

On the other hand, if the channel number to be directly selected is recognized to agree with the channel number of a channel on which a television picture is currently received at step S130, rescan is performed at step S150. The rescan will be described in conjunction with a drawing (FIG. 10) later.

Whether processing of step S140 or processing of step S150 is performed is verified. If an instruction of direct channel selection is not recognized to be issued at step S120, whether an instruction that the power supply of the television tuner 20 should be turned off is issued at step S160 is verified. If the instruction that the power supply of the television tuner 20 should be turned off is not issued, processing is returned to step S110. If the instruction that the power supply of the television tuner 20 should be turned off is issued, main processing is terminated.

Next, the flow of channel change to be invoked and executed at step S140 in the flowchart of FIG. 8 will be described in conjunction with FIG. 9. First, at step S300, an instruction of direct selection is checked to see if it instructs direct selection of a physical channel. In the processing, an instruction of direct channel selection recognized to be issued at step S120 in the flowchart of FIG. 8 is checked to see if it is an instruction that instructs direct selection of a physical channel.

If the instruction of direct selection is the instruction that instructs direct selection of a physical channel, a frequency band within which the tuner section 2 receives a television signal is determined by referencing the first table. Specifically, the first table shown in FIG. 5 is referenced in order to identify a frequency band corresponding to a physical channel whose direct selection is instructed. PLL data associated with the frequency band is supplied to the tuner section 22, whereby a frequency band within which the tuner section 22 receives a television signal is determined.

On the other hand, if the instruction of direct selection is not recognized as the instruction that instructs direct selection of a physical channel at step S300 (the instruction that instructs direct selection of a virtual channel), the first table shown in FIG. 5 and the second table shown in FIG. 6 are referenced in order to determine a frequency band within which the tuner section 22 receives a television signal. Specifically, first, the second table shown in FIG. 6 is referenced in order to select a physical channel associated with a virtual channel whose direct selection is instructed. Thereafter, the first table shown in FIG. 5 is referenced in order to identify a frequency band corresponding to the selected physical channel. PLL data associated with the frequency band is applied to the tuner section 22, whereby the frequency band within which the tuner section 22 receives a television signal is determined.

After processing of step S310 or processing of step S320 is performed, the receiving direction pattern D is set to a pattern D=0 at step S330. Moreover, bias voltages associated with the selected receiving direction pattern (D=0) are applied to the four phase shifters 12 respectively.

Thereafter, detection of a signal state is performed at step S340. If an alternating signal transferred from the tuner section 22 is a digital alternating signal, the state of the signal is detected by detecting an error rate caused by the digital I/F 23a and the demodulator circuit 23b. If the alternating signal transferred from the tuner section 22 is an analog alternating signal, the state of the signal is detected using an AGC voltage sent from the AGC circuit 24b1 to the CPU 28a.

Thereafter, at step S350, the detected signal state is checked to see if it agrees with a predetermined signal state. Data representing a criterion for detecting a signal state (data representing an error rate and data representing an AGC voltage) is stored in the ROM 28 included in the television tuner 20. During processing of step S350, a detected signal state is checked based on the data. If the detected signal state agrees with the predetermined signal state, channel change is terminated. Consequently, a receiving direction in which a signal whose state is recognized as the predetermined signal state at step S350 is sampled is preserved.

On the other hand, if the detected signal state is not recognized as the predetermined signal state at step S350, the receiving direction pattern D is checked to see if it has a value smaller than 15. If the receiving direction pattern D has a value smaller than 15, the value is incremented by one (D=D+1) in order to thus update the receiving direction pattern value. Thereafter, processing is returned to step S340. If the receiving direction pattern D is not recognized to have a value smaller than 15 (D=15), channel change is terminated.

Figure 9:
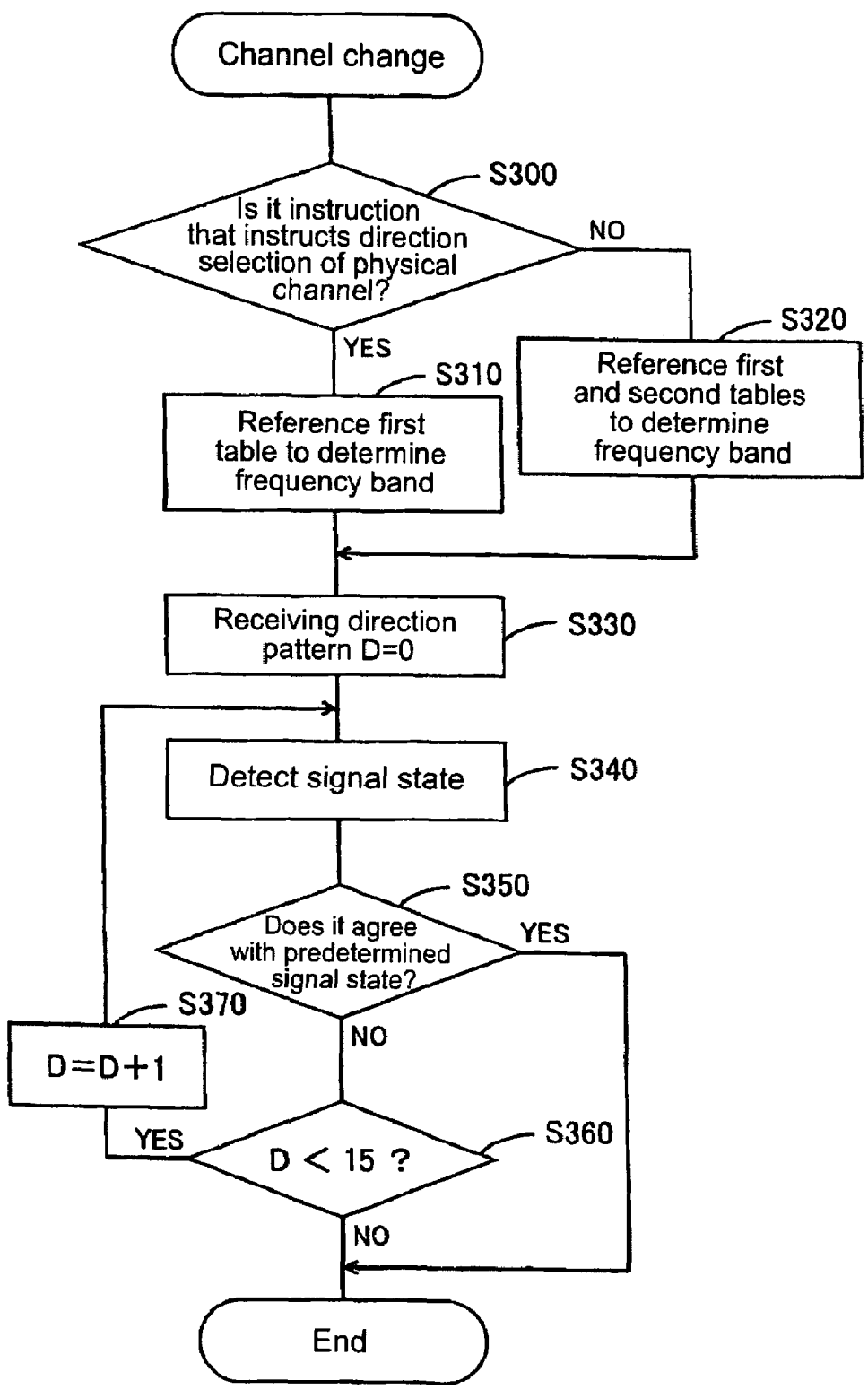
FIG. 9 is a flowchart describing channel change to be invoked and executed at step S140 mentioned in the flowchart of FIG. 8.
Figure 10:
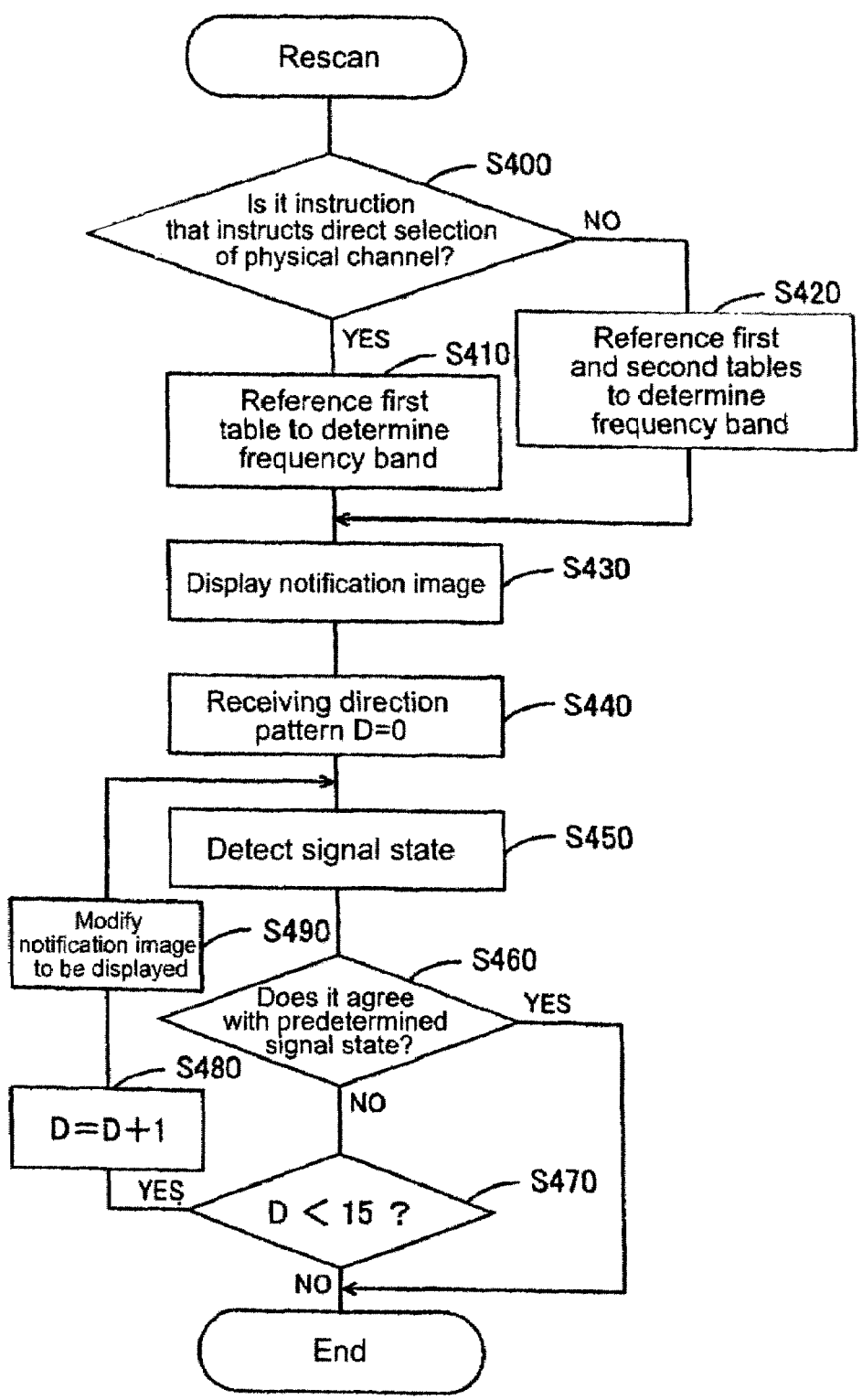
FIG. 10 is a flowchart describing rescan to be invoked and executed at step S150 mentioned in the flowchart of FIG. 8.

The flow of rescan to be invoked and executed at step S150 in the flowchart of FIG. 8 will be described in conjunction with FIG. 10. First, at step S400, an instruction of direct selection is checked to see if it is the instruction that instructs direct selection of a physical channel. The processing is identical to that of step S300 in the flowchart of FIG. 9. If the instruction of direct selection is the instruction that instructs direct selection of a physical channel, the first table is referenced in order to determine a frequency band within which the tuner section 22 receives a television signal at step S410. This processing is identical to that of step S310 in FIG. 9. On the other hand, if the instruction of direction selection is not recognized at step S400 as the instruction that instructs direct selection of a physical channel, the first table and second table are referenced in order to determine a frequency band within which the tuner section 22 receives a television signal. This processing is identical to that of step S320 mentioned in FIG. 9.

After processing of step S410 or step S420 is performed, a notification image is displayed at step S430. During the processing, a predetermined command is issued to the OSD block 28h so that the notification image signifying that rescan is under way is displayed on the television 30.

Thereafter, at step S440, the receiving direction pattern D is set to a pattern D=0. The processing is identical to that of step S330 in the flowchart of FIG. 9. At step S450, a signal state is detected. The processing is identical to that of step S340 in the flowchart of FIG. 9. At step S460, the detected signal state is checked to see if it agrees with a predetermined signal state. If the detected signal state agrees with the predetermined signal state, rescan is terminated. Consequently, a receiving direction in which a signal whose state is recognized as the predetermined signal state at step S460 is sampled is preserved.

On the other hand, if the detected signal state is not recognized as the predetermined signal state at step S460, the receiving direction pattern D is checked to see if it has a value smaller than 15 at step S470. If the receiving direction pattern D has a value smaller than 15, the value is incremented by one (D=D+1) in order to thus update the receiving direction pattern value. Thereafter, the notification image to be displayed is modified at step S490. During the processing, the notification image to be displayed on the television 30 is modified so that it will signify that rescan has progressed to a predetermined stage. After processing of step S490 is completed, processing is returned to step S450. If the receiving direction pattern D is not recognized to have a value smaller than 15 (D=15) at step S490, channel change is terminated.

Figure 8:
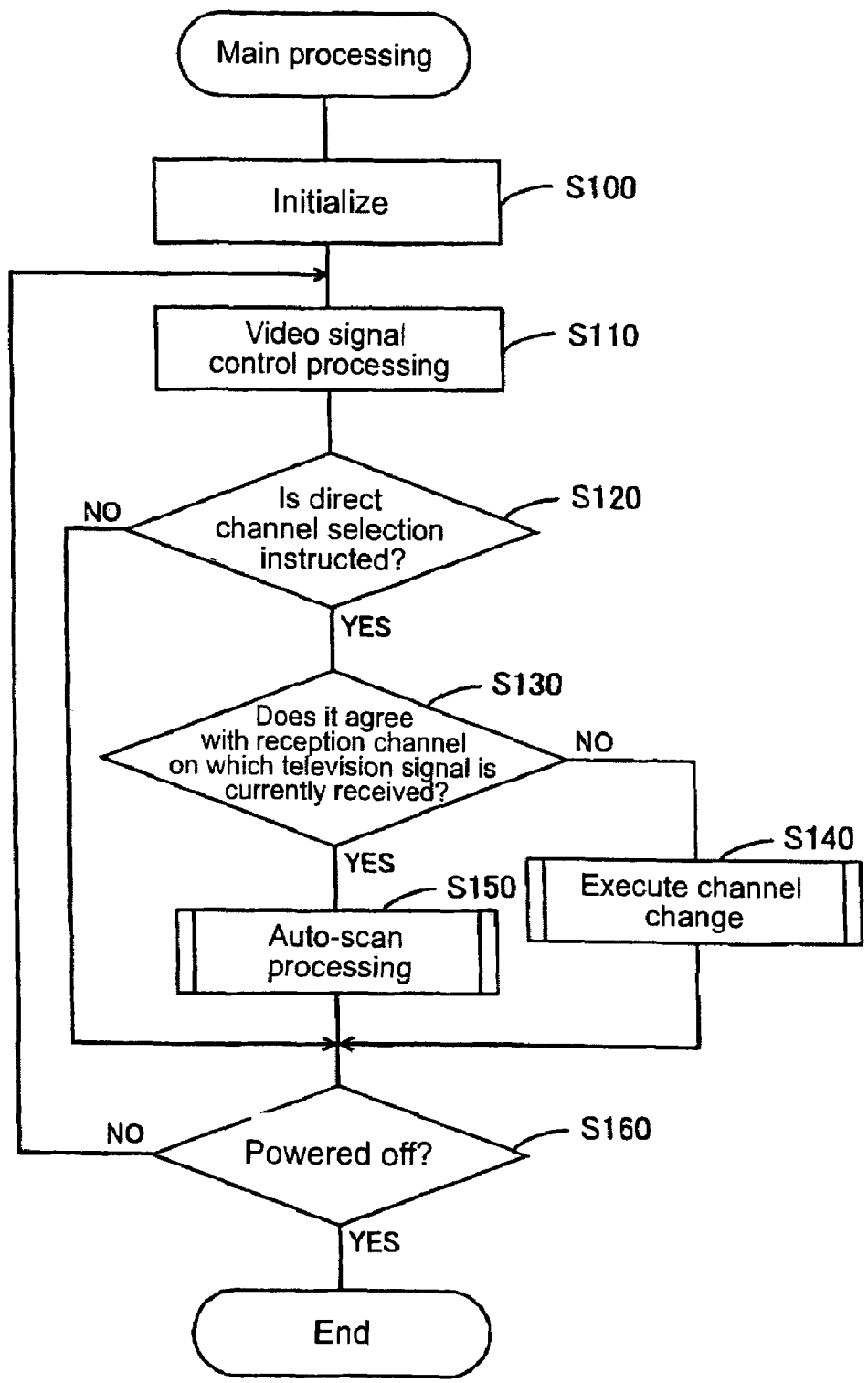
FIG. 8 is a flowchart describing main processing.

Next, a concrete case where main processing described in FIG. 8 is performed will be described below. First, initialization is performed (step S100). Thereafter, a television picture received on a current reception channel is displayed on the television 30 (step S110). Whether direct channel selection is instructed during display of the television picture is verified (step S120). If the direct channel selection is verified to be instructed, the instruction is checked to see if it instructs direct selection of a reception channel identical to the reception channel on which a television picture is currently received (step S130). If the instruction is not recognized as the instruction that instructs direction selection of a reception channel identical to the reception channel on which a television picture is currently received, channel change is executed (step S140). If the instruction is recognized as the instruction that instructs direction selection of a reception channel identical to the reception channel on which a television picture is currently received, rescan is executed (step S150).

Within channel change, first, an instruction of direction channel selection is checked to see if it is the instruction that instructs direct selection of a physical channel or direct selection of a virtual channel (step S300). If the instruction is the instruction that instructs direct selection of a physical channel, the first table is referenced in order to determine a frequency at which the tuner section 22 receives a television signal (step S310). On the other hand, if the instruction is the instruction that instructs direct selection of a virtual channel, the first table and second table are referenced in order to determine a frequency at which the tuner section 22 receives a television signal (step S320). The receiving direction pattern value D is incremented one by one from D=0, and the states of signals sampled in all receiving directions indicated with the receiving direction patterns are detected (step S330). Moreover, the detected signal state is checked to see if it agrees with a predetermined signal state (step S340). If the detected signal state is the predetermined signal state, the receiving direction in which the signal of the predetermined state is sampled is preserved.

On the other hand, within rescan, an instruction of direct channel selection is checked to see if it is the instruction that instructs direct selection of a physical channel or direct selection of a virtual channel (step S400). If the instruction is the instruction that instructs direct selection of a physical channel, the first table is referenced in order to determine a frequency at which the tuner section 22 receives a television signal (step S410). On the other hand, if the instruction is the instruction that instructs direct selection of a virtual channel, the first and second tables are referenced in order to determine a frequency at which the tuner section 22 receives a television signal (step S420). The receiving direction pattern value D is incremented one by one from D=0 with the reception channel held intact, and the states of signals sampled in all receiving directions indicated with the receiving direction patterns are detected (step S450). At the same time, a detected signal state is checked to see if it agrees with a predetermined signal state (step S460). If the detected signal state is the predetermined signal state, a receiving direction in which the signal of the predetermined state is sampled is preserved. Within the rescan, a notification image signifying that rescan is under way is displayed (step S430). Every time the state of a signal sampled in each receiving direction indicated with a receiving direction pattern is detected, the notification image to be displayed is modified so that it will signify that rescan has progressed (step S490).

Figure 11:
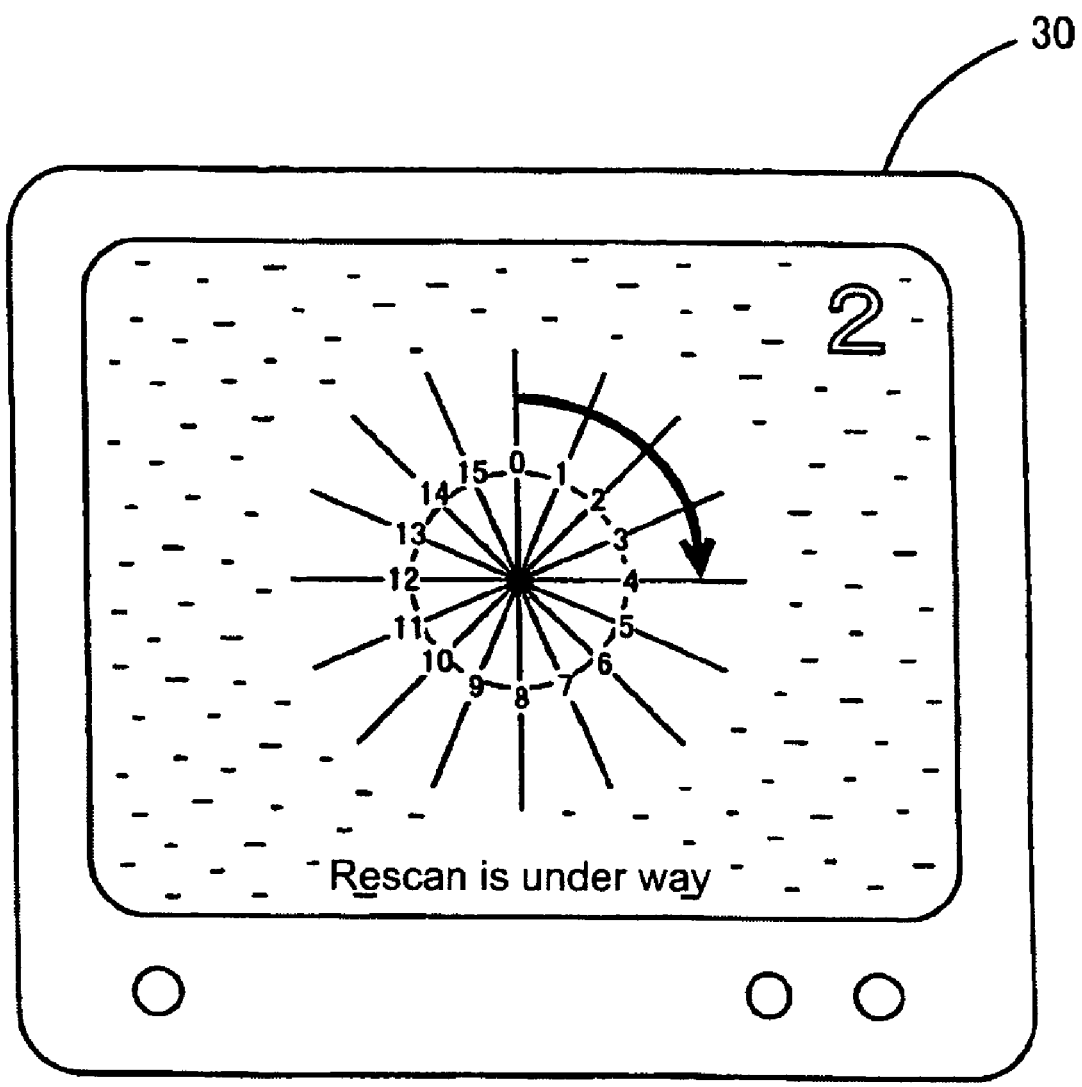
FIG. 11 illustrates an example of an image to be displayed on a television while rescan is under way.

Next, an example of the notification image to be displayed on the screen of the television 30 when rescan is performed as described in FIG. 10 will be described in conjunction with FIG. 11. The receiving direction patterns D=0 to D=15 are displayed and an arrow moving circumferentially outside the patterns is also displayed. The movement of the arrow indicates the progress of rescan. The notification image may be any image as long as the image allows a user to recognize that rescan is under way. The notification image is not limited to the example shown in FIG. 11. Moreover, according to the present invention, a sound or a voice may be used to notify of the fact that rescan is under way.

The present embodiment has been described on the assumption that the notification image is displayed when rescan (refer to FIG. 10) executed responsively to issuance of an instruction that instructs direct selection of a reception channel identical to the reception channel on which a television picture is currently received is under way. According to the present invention, the notification image may be displayed when channel change (refer to FIG. 9) executed responsively to issuance of an instruction that instructs direct selection of a reception channel different from the reception channel on which a television picture is currently received is under way.

As described so far, according to the present invention, rescan is executed responsively to issuance of an instruction that instructs direct selection of a reception channel on which a television picture is currently received. Therefore, rescan can be executed responsively to a simple manipulation which a user can easily and intuitively grasped.

What is claimed is:

1. A television tuner for control of directivity of an antenna, comprising:
   a directivity control section that generates an electric signal with which a directivity of the antenna is adjusted to enable the antenna to be directional to a selected direction, the directivity control section includes:
   plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, and for generating a directivity value;

a tuner section that receives and selects television signals from the antenna in a predetermined frequency band corresponding to a predetermined reception channel, and outputs an intermediate frequency (I/F) signal;

a signal condition detector section that detects a condition of the I/F signal;

if a frequency signal of the I/F signal is a digital frequency signal, the signal condition is determined by detecting a bit error rate; if the frequency signal of the I/F signal is an analog signal, the signal condition is determined by detecting an AGC voltage output;

a channel storing section that stores channel select data that are comprised of reception channels on which television signals are received, the channel select data includes:

a first list having a set of physical channel numbers and a corresponding set of frequency bands; and a second list having one or more virtual channel numbers associated with one or more physical channel numbers;

a video signal control for processing a television signal received on the predetermined reception channel to display an image;

a verification unit that determines if a received instruction is a direct channel selection instruction;

if the verification unit determines that the received instruction is the direct channel selection instruction, the verification unit determines if a selected reception channel within the direct channel selection instruction to select the reception channel agrees with the reception channels stored in the channel select data;

if the verification unit determines that the selected reception channel does agree with one or more reception channels stored in the channel select data, the verification unit determines if the selected reception channel agrees with a current reception channel, on which a current television signal is received;

if the verification unit determines that the selected reception channel agrees with the current reception channel on which the current television signal is received, a rescan unit commences an auto-scan processing; otherwise, a channel change module commences a channel change processing;

if the verification unit determines that the received instruction is not the direct channel selection instruction, the verification unit determines if the received instruction is to turn power OFF;

the rescan unit commencing the auto-scan processing and the channel change module commencing the channel change processing, include:

determining if the direct channel selection instruction is to instruct direction selection of physical channel;

if it is determined that the direct channel selection instruction is to instruct direction selection of physical channel, the first list of the channel storing section that stores channel select data is referenced to determine a frequency band of a selected physical channel;

if it is determined that the direct channel selection instruction is not to instruct direction selection of physical channel, the first list and the second list of the channel storing section that store channel select data are referenced for one or more virtual channel numbers associated with one or more channel numbers, which, in turn, are associated with the frequency band of the selected channel;

the auto-scan further includes:

displaying a notification image on a television display, with the notification image signifying that rescan is in progress, setting the directivity value of the antenna to a first directivity value, and with the signal condition detector section detecting the signal condition of the I/F signal output and determining if the detected signal condition is commensurate with the predetermined signal condition;

if the detected signal condition is commensurate with the predetermined signal condition, the rescan is ceased; otherwise, determining if the set directivity value is less than the predetermined directivity value; if it is determined that the set directivity value is less than the predetermined directivity value, incrementing the directivity value, and enabling the display control unit to modify the notification image by displaying an updated receiving direction pattern and an associated indicator, which represent a progress of rescan with an arrow moving circumferentially outside the updated receiving direction pattern, indicating a state of the I/F signal sampled, and detecting the signal condition based on the incremented directivity value.

2. A television tuner for control of directivity of an antenna, comprising:

a directivity control section that generates an electric signal with which a directivity of the antenna is adjusted to enable the antenna to be directional to a selected direction, the directivity control section includes:

plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, and for generating a directivity value;

a tuner section that receives and selects television signals from the antenna in a predetermined frequency band corresponding to a predetermined reception channel, and outputs an intermediate frequency (I/F) signal;

a signal condition detector section that detects a condition of the I/F signal;

a rescan unit that executes a rescan, including:

displaying a notification image on a television display, with the notification image signifying that rescan is in progress, setting the directivity value of the antenna to a first directivity value, and with the signal condition detector section detecting the signal condition of the I/F signal output and determining if the detected signal condition is commensurate with a predetermined signal condition;

if the detected signal condition is commensurate with the predetermined signal condition, the rescan is ceased; otherwise, determining if the set directivity value is less than the predetermined directivity value; if it is determined that the set directivity value is less than the predetermined directivity value, incrementing the directivity value, and enabling the display control unit to modify the notification image by displaying an updated receiving direction pattern and an associated indicator, which represent a progress of rescan with an arrow moving circumferentially outside the updated receiving direction pattern, indicating a state of the I/F signal sampled, and detecting the signal condition based on the incremented directivity value;

a channel storing section that stores channel select data that are comprised of reception channels on which television signals are received, the channel select data includes:

a first list having a set of physical channel numbers and a corresponding set of frequency bands; and a second list having one or more virtual channel numbers associated with one or more physical channel numbers;

a video signal control for processing a television signal received on the predetermined reception channel to display an image;

a verification unit that determines if a received instruction is a direct channel selection instruction;

if the verification unit determines that the received instruction is the direct channel selection instruction, the verification unit determines if a selected reception channel within the direct channel selection instruction to select the reception channel agrees with the reception channels stored in the channel select data;

if the verification unit determines that the selected reception channel does agree with one or more reception channels stored in the channel select data, the verification unit determines if the selected reception channel agrees with a current reception channel, on which a current television signal is received;

if the verification unit determines that the selected reception channel agrees with the current reception channel on which the current television signal is received, the rescan unit commences rescan; otherwise, a channel change module commences a channel change processing;

if the verification unit determines that the received instruction is not the direct channel selection instruction, the verification unit determines if the received instruction is to turn power OFF;

the rescan unit commencing the auto-scan processing and the channel change module commencing the channel change processing, include:

determining if the direct channel selection instruction is to instruct direction selection of physical channel;

if it is determined that the direct channel selection instruction is to instruct direction selection of physical channel, the first list of the channel storing section that stores channel select data is referenced to determine a frequency band of a selected physical channel;

if it is determined that the direct channel selection instruction is not to instruct direction selection of physical channel, the first list and the second list of the channel storing section that store channel select data are referenced for one or more virtual channel numbers associated with one or more channel numbers, which, in turn, are associated with the frequency band of the selected channel.

3. The television tuner for control of directivity of an antenna as set forth in claim 2, wherein:

if a frequency signal of the I/F signal is a digital frequency signal, the signal condition is determined by detecting a bit error rate; if the frequency signal of the I/F signal is an analog signal, the signal condition is determined by detecting an AGC voltage output.

4. A television tuner for control of directivity of an antenna, comprising:

a directivity control section that generates an electric signal with which a directivity of the antenna is adjusted to enable the antenna to be directional to a selected direction, the directivity control section includes:

plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, and for generating a directivity value;

a tuner section that receives and selects television signals from the antenna in a predetermined frequency band corresponding to a predetermined reception channel, and outputs an intermediate frequency (I/F) signal;

a signal condition detector section that detects a condition of the TIE signal;

if a frequency signal of the I/F signal is a digital frequency signal, the signal condition is determined by detecting a bit error rate; if the frequency signal of the I/F signal is an analog signal, the signal condition is determined by detecting an AGC voltage output;

a channel storing section that stores channel select data that are comprised of reception channels on which television signals are received, the channel select data includes:

a first list having a set of physical channel numbers and a corresponding set of frequency bands; and a second list having one or more virtual channel numbers associated with one or more physical channel numbers;

a video signal control for processing a television signal received on the predetermined reception channel to display an image;

a verification unit that determines if a received instruction is a direct channel selection instruction;

if the verification unit determines that the received instruction is the direct channel selection instruction, the verification unit determines if a selected reception channel within the direct channel selection instruction to select the reception channel agrees with the reception channels stored in the channel select data;

if the verification unit determines that the selected reception channel does agree with one or more reception channels stored in the channel select data, the verification unit determines if the selected reception channel agrees with a current reception channel, on which a current television signal is received;

if the verification unit determines that the selected reception channel agrees with the current reception channel on which the current television signal is received, a rescan unit commences an auto-scan processing; otherwise, a channel change module commences a channel change processing;

if the verification unit determines that the received instruction is not the direct channel selection instruction, the verification unit determines if the received instruction is to turn power OFF;

the rescan unit commencing the auto-scan processing and the channel change module commencing the channel change processing, include:

determining if the direct channel selection instruction is to instruct direction selection of physical channel;

if it is determined that the direct channel selection instruction is to instruct direction selection of physical channel, the first list of the channel storing section that stores channel select data is referenced to determine a frequency band of a selected physical channel;

if it is determined that the direct channel selection instruction is not to instruct direction selection of physical channel, the first list and the second list of the channel storing section that store channel select data are referenced for one or more virtual channel numbers associated with one or more channel numbers, which, in turn, are associated with the frequency band of the selected channel;

the channel change processing further includes:

setting the directivity value of the antenna to a first directivity value, and with the signal condition detector section detecting the signal condition of the hF signal output and determining if the detected signal condition is commensurate with the predetermined signal condition;

if the detected signal condition is commensurate with the predetermined signal condition, the change channel is ceased; otherwise, determining if the set directivity value is less than the predetermined directivity value; if it is determined that the set directivity value is less than the predetermined directivity value, incrementing the directivity value, and detecting the signal condition based on the incremented directivity value.

* * * * *